US012670903B2

(12) United States Patent
Sharifi et al.

(10) Patent No.: US 12,670,903 B2
(45) Date of Patent: Jun. 30, 2026

(54) SHORT-LIVED REPEAT VOICE COMMANDS

(71) Applicant: Google LLC, Mountain View, CA (US)

(72) Inventors: Matthew Sharifi, Kilchberg (CH);
Victor Carbune, Zürich (CH)

(73) Assignee: Google LLC, Mountain View, CA (US)

( * ) Notice: Subject to any disclaimer, the term of this patent is extended or adjusted under 35 U.S.C. 154(b) by 525 days.

(21) Appl. No.: 18/055,404

(22) Filed: Nov. 14, 2022

(65) Prior Publication Data

US 2024/0161741 A1     May 16, 2024

(51) Int. Cl.
*G10L 15/22*     (2006.01)
*G10L 15/08*     (2006.01)

(52) U.S. Cl.
CPC .............. *G10L 15/22* (2013.01); *G10L 15/08* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 2006/0287866 A1* | 12/2006 | Cross, Jr. .............. | G10L 15/197 704/275 |
| 2016/0358603 A1* | 12/2016 | Azam ...................... | G10L 15/26 |
| 2018/0182390 A1* | 6/2018 | Hughes ................... | G10L 15/22 |
| 2018/0260718 A1* | 9/2018 | Biswas ................... | G06F 40/20 |
| 2019/0371342 A1* | 12/2019 | Tukka ..................... | G10L 17/22 |
| 2019/0371343 A1* | 12/2019 | Tukka ..................... | G10L 17/22 |
| 2020/0051554 A1* | 2/2020 | Kim ........................ | G06F 3/167 |
| 2020/0342855 A1 | 10/2020 | Casado | |
| 2020/0342866 A1* | 10/2020 | Casado ................... | G10L 15/02 |
| 2021/0055909 A1* | 2/2021 | Rahim .................... | G10L 15/22 |
| 2021/0326103 A1* | 10/2021 | Mutagi ................... | G10L 15/26 |
| 2021/0335342 A1* | 10/2021 | Yuan ...................... | G06N 20/00 |
| 2022/0189465 A1* | 6/2022 | Sharifi ................... | G10L 15/22 |
| 2023/0260512 A1* | 8/2023 | Kim ................... | G10L 15/1815 704/244 |
| 2024/0161741 A1* | 5/2024 | Sharifi ................... | G06F 3/167 |

OTHER PUBLICATIONS

International Search Report and Written Opinion for related PCT Application No. PCT/US2023/036641, dated Jan. 25, 2024.

* cited by examiner

*Primary Examiner* — Jonathan C Kim
(74) *Attorney, Agent, or Firm* — Honigman LLP; Brett A. Krueger; Grant Griffith

(57) ABSTRACT

A method for detecting short-lived repeat voice commands includes activating a set of one or more warm words each associated with a respective action for controlling a long-standing operation performed by a digital assistant. While the digital assistant is performing the long-standing operation, the method includes receiving audio data, and detecting, in the audio data, a warm word from the activated set of one or more warm words. In response to detecting the warm word, the method includes performing the respective action associated with the detected warm word, and activating a set of one or more repeat warm words associated with the detected warm word. The method further includes receiving additional audio data, detecting, in the additional audio data, a repeat warm word from the activated set of one or more repeat warm words, and performing the respective action associated with the detected repeat warm word.

24 Claims, 7 Drawing Sheets

SHORT-LIVED REPEAT VOICE COMMANDS

TECHNICAL FIELD

This disclosure relates to short-lived repeat voice commands.

BACKGROUND

A speech-enabled environment permits a user to only speak a query or command out loud and a digital assistant will field and answer the query and/or cause the command to be performed. A speech-enabled environment (e.g., home, workplace, school, etc.) can be implemented using a network of connected microphone devices distributed throughout various rooms and/or areas of the environment. Through such a network of microphones, a user has the power to orally query the digital assistant from essentially anywhere in the environment without the need to have a computer or other device in front of him/her or even nearby. For example, while cooking in the kitchen, a user might ask the digital assistant "please set a timer for 20-minutes" and, in response, the digital assistant will confirm that the timer has been set (e.g., in a form of a synthesized voice output) and then alert (e.g., in the form of an alarm or other audible alert from an acoustic speaker) the user once the timer lapses after 20-minutes. Often, there is more than one way to ask the digital assistant to perform an action. For instance, a user might speak "more time" or "longer," both of which may indicate that the user wants additional time added to the timer beyond the initial timer of 20-minutes, and in response, the digital assistant can detect the particular action of increasing the time on the timer and then add time to the timer.

SUMMARY

One aspect of the disclosure provides a computer-implemented method that when executed on data processing hardware causes the data processing hardware to perform operations that include activating a set of one or more warm words each associated with a respective action for controlling a long-standing operation performed by a digital assistant. While the digital assistant is performing the long-standing operation and the set of one or more warm words are activated, the operations also include receiving audio data corresponding to a first utterance captured by an assistant-enabled device, and detecting, in the audio data, a warm word from the activated set of one or more warm words. In response to detecting the warm word from the activated set of one or more warm words, the operations also include performing the respective action associated with the detected warm word for controlling the long-standing operation, and activating a set of one or more repeat warm words associated with the detected warm word. Here, each of the activated set of one or more repeat warm words is associated with a respective action for controlling the long-standing operation. The operations further include, receiving additional audio data corresponding to a second utterance captured by the assistant-enabled device, and detecting, in the additional audio data, a repeat warm word from the activated set of one or more repeat warm words. In response to detecting the repeat warm word from the set of one or more repeat warm words, the operations also include performing the respective action associated with the detected repeat warm word for controlling the long-standing operation.

Implementations of the disclosure may include one or more of the following optional features. In some implementations, activating the set of one or more repeat warm words includes activating, for each corresponding repeat warm word in the activated set of one or more repeat warm words, a respective repeat warm word model to run on the assistant-enabled device. Here, detecting, in the additional audio data, the repeat warm word from the activated set of one or more repeat warm words includes detecting, using the respective repeat warm word model activated for the corresponding detected repeat warm word, the repeat warm word in the additional audio data without performing speech recognition on the additional audio data. In these implementations, detecting the repeat warm word in the additional audio data may include extracting audio features of the additional audio data, generating, using the respective repeat warm word model activated for the corresponding detected repeat warm word, a repeat warm word confidence score by processing the extracted audio features, and determining that the additional audio data corresponding to the second utterance includes the corresponding repeat warm word when the repeat warm word confidence score satisfies a repeat warm word confidence threshold. Additionally or alternatively, detecting, in the audio data, the warm word from the activated set of one or more warm words includes detecting, using a respective warm model activated for the corresponding warm word, the warm word in the audio data without performing speech recognition on the audio data. Here, the respective repeat warm word model activated for the corresponding detected repeat warm word in the additional audio data is derived from the respective warm word model activated for detecting the corresponding warm word in the audio data.

In some examples, activating the set of one or more repeat warm words includes executing a speech recognizer on the assistant-enabled device, and detecting, in the additional audio data, the repeat warm word from the activated set of one or more repeat warm words includes recognizing, using the speech recognizer executing on the assistant-enabled device, the repeat warm word in the additional audio data. Here, the speech recognizer is biased to recognize the repeat warm words in the activated set of one or more repeat warm words. In some implementations, the operations include receiving, in a user interface associated with the assistant-enabled device that presents a list of available repeat warm words to add and/or remove from the set of one or more repeat warm words associated with the warm word and to be activated when the warm word is detected in the audio data, a user input indication indicating selection of one or more of the available repeat warm words to add to the set of one or more repeat warm words. In these implementations, each corresponding available repeat warm word in the list of available repeat warm words presented by the user interface associated with the assistant-enabled device may be displayed by the user interface as a respective graphical element that may be selected to add or remove the corresponding available repeat warm word to the set of one or more warm words associated with warm word and to be activated when the warm word is detected in the audio data.

In some examples, the operations further include obtaining a voice command log containing prior instances of a user of the assistant-enabled device speaking repeat voice commands for controlling the long-standing operation immediately after detecting warm words in prior audio data. Here, at least one repeat warm word in the activated set of one or more warm words is learned based on the repeat voice commands. In these examples, the operations may further include prompting a user of the assistant-enabled device to add a repeat voice command contained in the voice command log to the set of one or more repeat warm words associated with the detected warm word. In response to receiving a user indication indicating an approval to add the repeat voice command to the set of one or more repeat warm words, the operations also include associating the repeat voice command with the detected warm word, and activating the repeat voice command as a repeat warm word associated with the detected warm word.

In some implementations, the respective action for controlling the long-standing operation that is associated with at least one repeat warm word in the activated set of one or more repeat warm words is the same as the respective action performed in response to detecting the associated warm word from the activated set of one or more warm words in the audio data. In other implementations, the respective action for controlling the long-standing operation that is associated with at least one repeat warm word in the activated set of one or more repeat warm words is different than the respective action performed in response to detecting the associated warm word from the activated set of one or more warm words in the audio data. In some examples, activating the set of one or more repeat warm words associated with the detected warm word includes activating the set of one or more repeat warm words for a predetermined time duration.

In some implementations, after performing the respective action associated with the detected repeat warm word for controlling the long-standing operation, the operations further include maintaining activation of at least one of the repeat warm words in the set of one or more repeat warm words associated with the detected warm word. In some examples, after performing the respective action associated with the detected repeat warm word for controlling the long-standing operation, the operations further include deactivating the set of one or more repeat warm words based on receiving a command that conflicts with the long-standing operation, or failing to detect an additional repeat warm word of the activated set of one or more repeat warm words after a predetermined time duration lapses. In some implementations, in response to detecting the warm word from the activated set of one or more warm words, the operations further include activating a set of one or more warm words each associated with a respective action for controlling a different long-standing operation than the long-standing operation.

Another aspect of the disclosure provides a system including data processing hardware and memory hardware in communication with the data processing hardware. The memory hardware stores instructions that when executed by the data processing hardware cause the data processing hardware to perform operations that include activating a set of one or more warm words each associated with a respective action for controlling a long-standing operation performed by a digital assistant. While the digital assistant is performing the long-standing operation and the set of one or more warm words are activated, the operations also include receiving audio data corresponding to a first utterance captured by an assistant-enabled device, and detecting, in the audio data, a warm word from the activated set of one or more warm words. In response to detecting the warm word from the activated set of one or more warm words, the operations also include performing the respective action associated with the detected warm word for controlling the long-standing operation, and activating a set of one or more repeat warm words associated with the detected warm word.

Here, each of the activated set of one or more repeat warm words is associated with a respective action for controlling the long-standing operation. The operations further include, receiving additional audio data corresponding to a second utterance captured by the assistant-enabled device, and detecting, in the additional audio data, a repeat warm word from the activated set of one or more repeat warm words. In response to detecting the repeat warm word from the set of one or more repeat warm words, the operations also include performing the respective action associated with the detected repeat warm word for controlling the long-standing operation.

This aspect may include one or more of the following optional features. In some implementations, activating the set of one or more repeat warm words includes activating, for each corresponding repeat warm word in the activated set of one or more repeat warm words, a respective repeat warm word model to run on the assistant-enabled device. Here, detecting, in the additional audio data, the repeat warm word from the activated set of one or more repeat warm words includes detecting, using the respective repeat warm word model activated for the corresponding detected repeat warm word, the repeat warm word in the additional audio data without performing speech recognition on the additional audio data. In these implementations, detecting the repeat warm word in the additional audio data may include extracting audio features of the additional audio data, generating, using the respective repeat warm word model activated for the corresponding detected repeat warm word, a repeat warm word confidence score by processing the extracted audio features, and determining that the additional audio data corresponding to the second utterance includes the corresponding repeat warm word when the repeat warm word confidence score satisfies a repeat warm word confidence threshold. Additionally or alternatively, detecting, in the audio data, the warm word from the activated set of one or more warm words includes detecting, using a respective warm model activated for the corresponding warm word, the warm word in the audio data without performing speech recognition on the audio data. Here, the respective repeat warm word model activated for the corresponding detected repeat warm word in the additional audio data is derived from the respective warm word model activated for detecting the corresponding warm word in the audio data.

In some examples, activating the set of one or more repeat warm words includes executing a speech recognizer on the assistant-enabled device, and detecting, in the additional audio data, the repeat warm word from the activated set of one or more repeat warm words includes recognizing, using the speech recognizer executing on the assistant-enabled device, the repeat warm word in the additional audio data. Here, the speech recognizer is biased to recognize the repeat warm words in the activated set of one or more repeat warm words. In some implementations, the operations include receiving, in a user interface associated with the assistant-enabled device that presents a list of available repeat warm words to add and/or remove from the set of one or more repeat warm words associated with the warm word and to be activated when the warm word is detected in the audio data, a user input indication indicating selection of one or more of the available repeat warm words to add to the set of one or more repeat warm words. In these implementations, each corresponding available repeat warm word in the list of available repeat warm words presented by the user interface associated with the assistant-enabled device may be displayed by the user interface as a respective graphical element that may be selected to add or remove the corresponding available repeat warm word to the set of one or more warm words associated with warm word and to be activated when the warm word is detected in the audio data.

In some examples, the operations further include obtaining a voice command log containing prior instances of a user of the assistant-enabled device speaking repeat voice commands for controlling the long-standing operation immediately after detecting warm words in prior audio data. Here, at least one repeat warm word in the activated set of one or more warm words is learned based on the repeat voice commands. In these examples, the operations may further include prompting a user of the assistant-enabled device to add a repeat voice command contained in the voice command log to the set of one or more repeat warm words associated with the detected warm word. In response to receiving a user indication indicating an approval to add the repeat voice command to the set of one or more repeat warm words, the operations also include associating the repeat voice command with the detected warm word, and activating the repeat voice command as a repeat warm word associated with the detected warm word.

In some implementations, the respective action for controlling the long-standing operation that is associated with at least one repeat warm word in the activated set of one or more repeat warm words is the same as the respective action performed in response to detecting the associated warm word from the activated set of one or more warm words in the audio data. In other implementations, the respective action for controlling the long-standing operation that is associated with at least one repeat warm word in the activated set of one or more repeat warm words is different than the respective action performed in response to detecting the associated warm word from the activated set of one or more warm words in the audio data. In some examples, activating the set of one or more repeat warm words associated with the detected warm word includes activating the set of one or more repeat warm words for a predetermined time duration.

In some implementations, after performing the respective action associated with the detected repeat warm word for controlling the long-standing operation, the operations further include maintaining activation of at least one of the repeat warm words in the set of one or more repeat warm words associated with the detected warm word. In some examples, after performing the respective action associated with the detected repeat warm word for controlling the long-standing operation, the operations further include deactivating the set of one or more repeat warm words based on receiving a command that conflicts with the long-standing operation, or failing to detect an additional repeat warm word of the activated set of one or more repeat warm words after a predetermined time duration lapses. In some implementations, in response to detecting the warm word from the activated set of one or more warm words, the operations further include activating a set of one or more warm words each associated with a respective action for controlling a different long-standing operation than the long-standing operation.

The details of one or more implementations of the disclosure are set forth in the accompanying drawings and the description below. Other aspects, features, and advantages will be apparent from the description and drawings, and from the claims.

6

Figure 2:
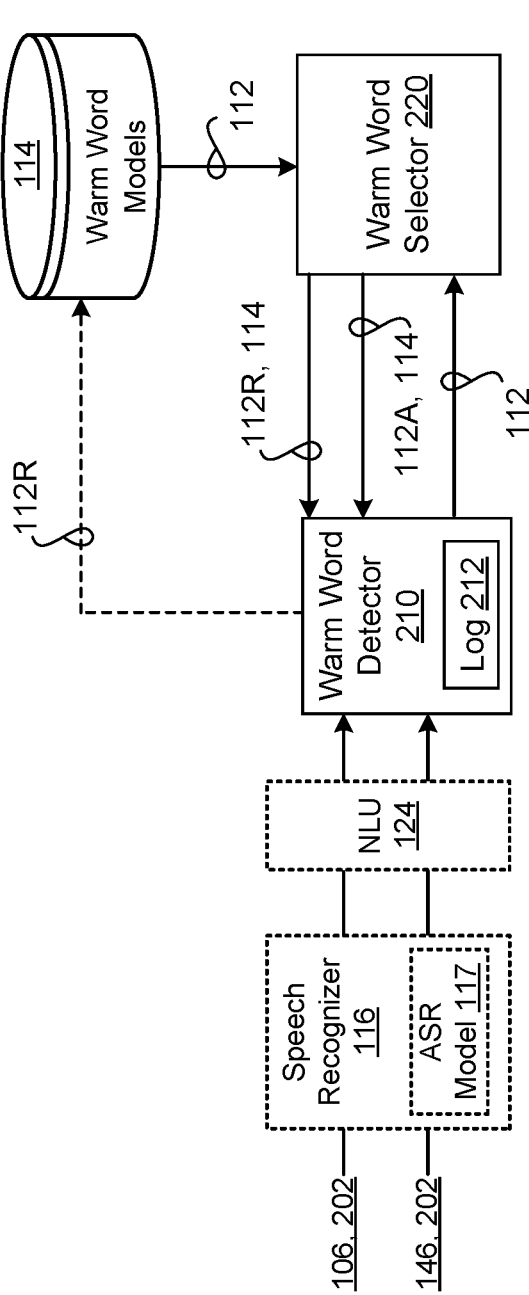

FIG. 2 is a schematic view of a repeat warm word detection process.

Figure 3:
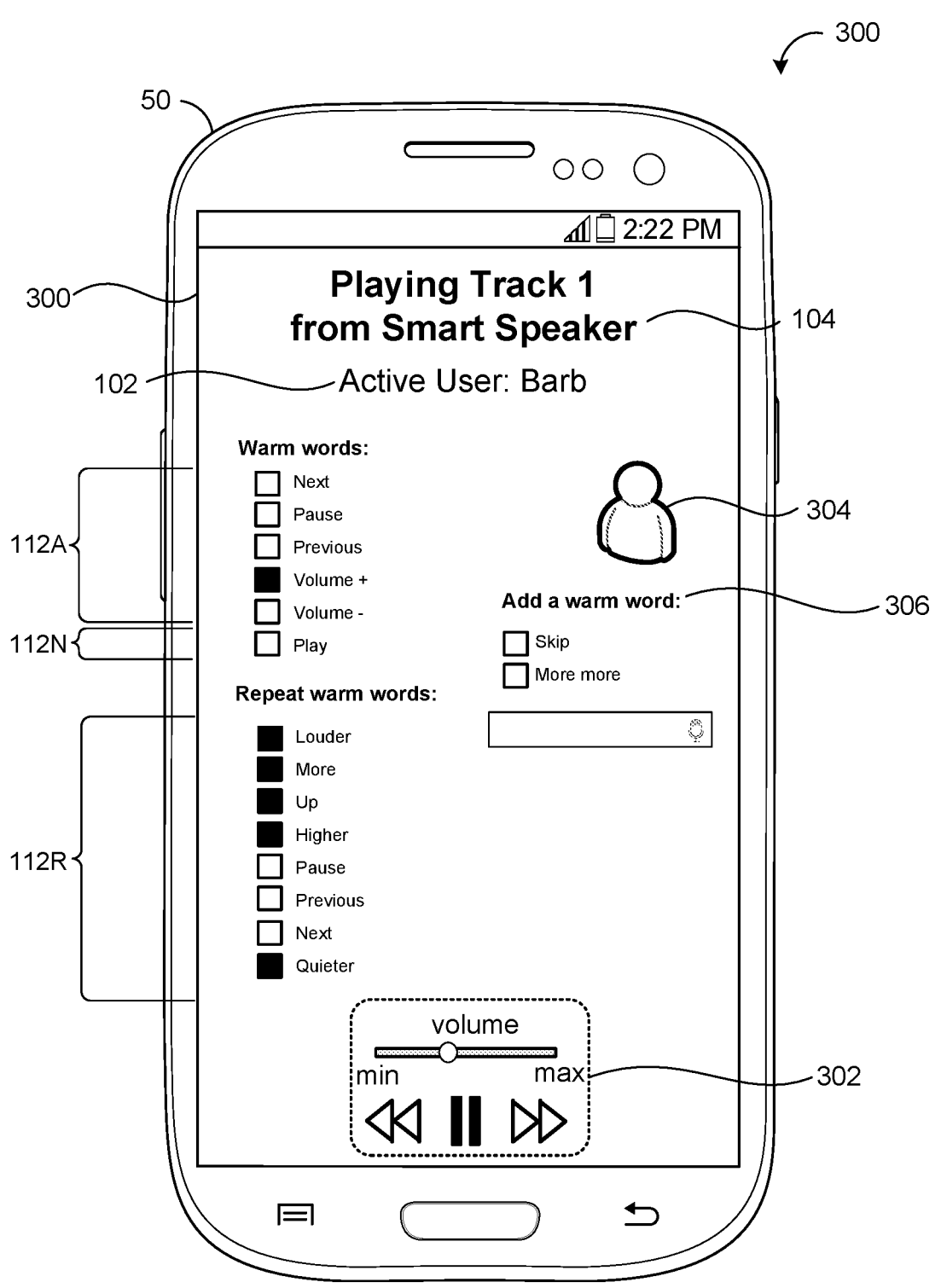

FIG. 3 is an example GUI rendered on the screen of a user device.

Figure 4:
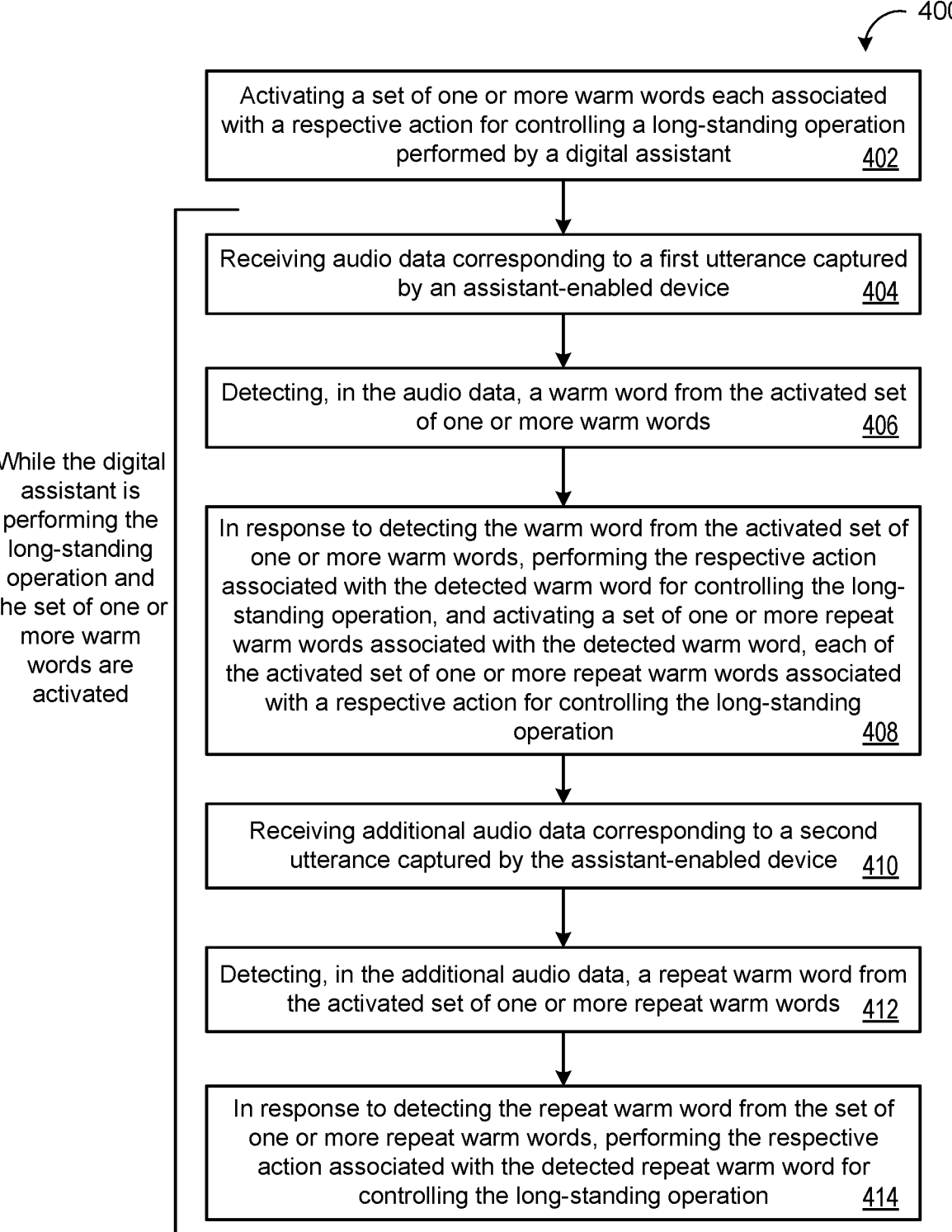

FIG. 4 is a flowchart of an example arrangement of operations for a method for detecting repeat warm words.

Figure 5:
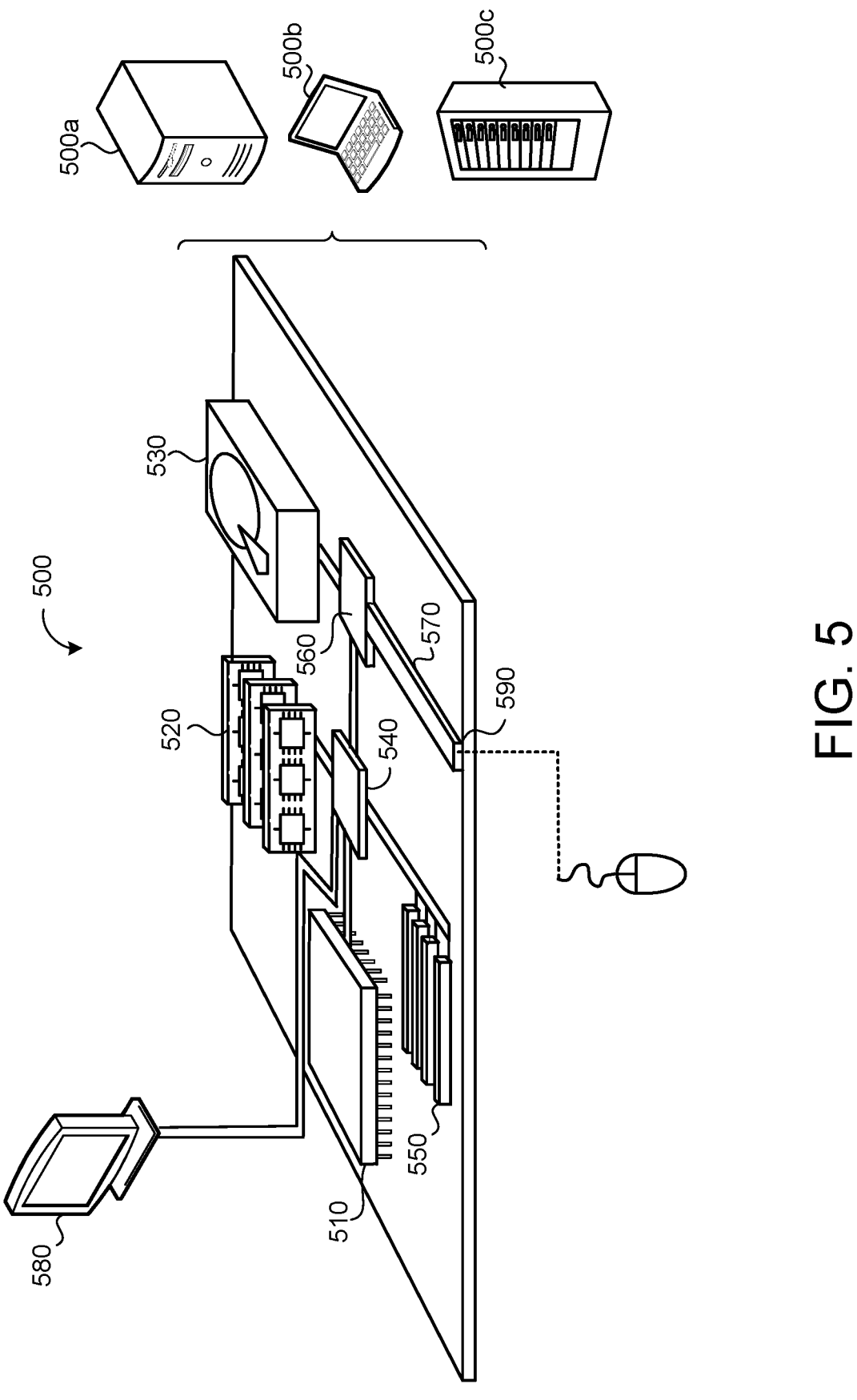

FIG. 5 is a schematic view of an example computing device that may be used to implement the systems and methods described herein.

Like reference symbols in the various drawings indicate like elements.

DETAILED DESCRIPTION

A user's manner of interacting with an assistant-enabled device is designed to be primarily, if not exclusively, by means of voice input. Consequently, the assistant-enabled device must have some way of discerning when any given utterance in a surrounding environment is directed toward the device as opposed to being directed to an individual in the environment or originating from a non-human source (e.g., a television or music player). One way to accomplish this is to use a hotword, which by agreement among the users in the environment, is reserved as a predetermined word(s) that is spoken to invoke the attention of the device. In an example environment, the hotword used to invoke the assistant's attention are the words "OK computer." Consequently, each time the words "OK computer" are spoken, it is picked up by a microphone, conveyed to a hotword detector, which performs speech understanding techniques to determine whether the hotword was spoken and, if so, awaits an ensuing command or query. Accordingly, utterances directed at an assistant-enabled device take the general form [HOTWORD] [QUERY], where "HOTWORD" in this example is "OK computer" and "QUERY" can be any question, command, declaration, or other request that can be speech recognized, parsed and acted on by the system, either alone or in conjunction with the server via the network.

In cases where the user provides several hotword based commands to an assistant-enabled device, such as a mobile phone or smart speaker, the user's interaction with the phone or speaker may become awkward. The user may speak, "Ok computer, play my studying playlist." The phone or speaker may begin to play the first song on the playlist. The user may wish to increase the volume of the music and speak, "Ok computer, volume up." To increase the volume yet again, the user may speak, "Ok computer, volume up," again. To alleviate the need to keep repeating the hotword before speaking a command, the assistant-enabled device may be configured to recognize/detect a narrow set of hotphrases or warm words to directly trigger respective actions. In the example, the warm word "volume up" serves the dual purpose of a hotword and a command so that the user can simply utter "volume up" to invoke the assistant-enabled device to trigger performance of the respective action instead of uttering "Ok computer, volume up."

While the spoken command "volume up" on its own may be a natural way of communicating the user's intent to increase the volume of the music, a user may find interacting with the phone or speaker unnatural when restricted to "volume up" as the only way to adjust the volume. For example, if the user wishes to continue to adjust the volume, rather than repeatedly speaking "volume up," the user may speak alternative voice commands such as "more", "again", or "louder" that are associated with "volume up" (i.e., trigger the same action), but are more natural to repeat within a limited amount of time after the user speaks "volume up."

A set of warm words can be active for controlling a long-standing operation. As used herein, a long-standing operation refers to an application or event that a digital assistant performs that may last for an extended duration or a discrete period of time and one that can be controlled by the user while the application or event is in progress. For instance, when a digital assistant sets a timer for 30-minutes, the timer is a long-standing operation from the time of setting the timer until the timer ends or a resulting alert is acknowledged after the timer ends. In this instance, a warm word such as "stop timer" could be active to allow the user to stop the timer by simply speaking "stop timer" without first speaking the hotword. Likewise, a command instructing the digital assistant to play music from a streaming music service is a long-standing operation while the digital assistant is streaming music from the streaming music service through a playback device. In this instance, an active set of warm words can be "pause", "pause music", "volume up", "volume down", "next", "previous", etc., for controlling playback of the music the digital assistant is streaming through the playback device. The long-standing operation may include multi-step dialogue queries such as "book a restaurant" in which different sets of warm words will be active depending on a given stage of the multi-step dialogue. For instance, the digital assistant may prompt a user to select from a list of restaurants, whereby a set of warm words may become active that each include a respective identifier (e.g., restaurant name or number in list) for selecting a restaurant from the list and complete the action of booking a reservation for that restaurant.

Furthermore, each warm word in the set of warm words for controlling a long-standing operation can include one or more repeat voice commands that are associated with a warm word and active for a limited amount of time after a user invokes the warm word. For example, the warm word "tell me a joke" for the long-standing operation of querying a digital assistant may have the repeat warm word "another" associated with it. Similarly, the warm word "turn up the lighting" for the long-standing operation of operating a smart lightbulb may have the repeat warm word "brighter" associated with it.

One challenge with repeat warm words is limiting the number of words/phrases that are simultaneously active so that quality and efficiency is not degraded. For instance, a number of false positives indicating when the assistant-enabled device incorrectly detected/recognized one of the active words greatly increases the larger the number of repeat warm words that are simultaneously active. Implementations herein are directed toward activating a set of one or more repeat warm words associated with a long-standing operation in progress that are active for a period of time after a user has invoked an active warm word for controlling the long-standing operations. That is, the repeat warm words that are active are associated with a high likelihood of being spoken by a user after the initial warm word for controlling the long-standing operation. A warm word detector may run on the assistant device and consume low power.

By associating repeat warm words with a particular active warm word so that the repeat warm words are warm word dependent, accuracy in triggering respective actions upon detecting the repeat warm words is improved since the assistant device is biased to detect the repeat warm words once the particular active warm word is spoken. Additionally, processing costs are improved since the number of times the assistant device wakes-up and potentially connects to a server reduces, as well as the number of false positives are reduced. Moreover, a user's experience with the digital assistant improves since the user's commands to control performance of the long-standing operation more closely mirror natural, conversational interactions.

Figure 1A:
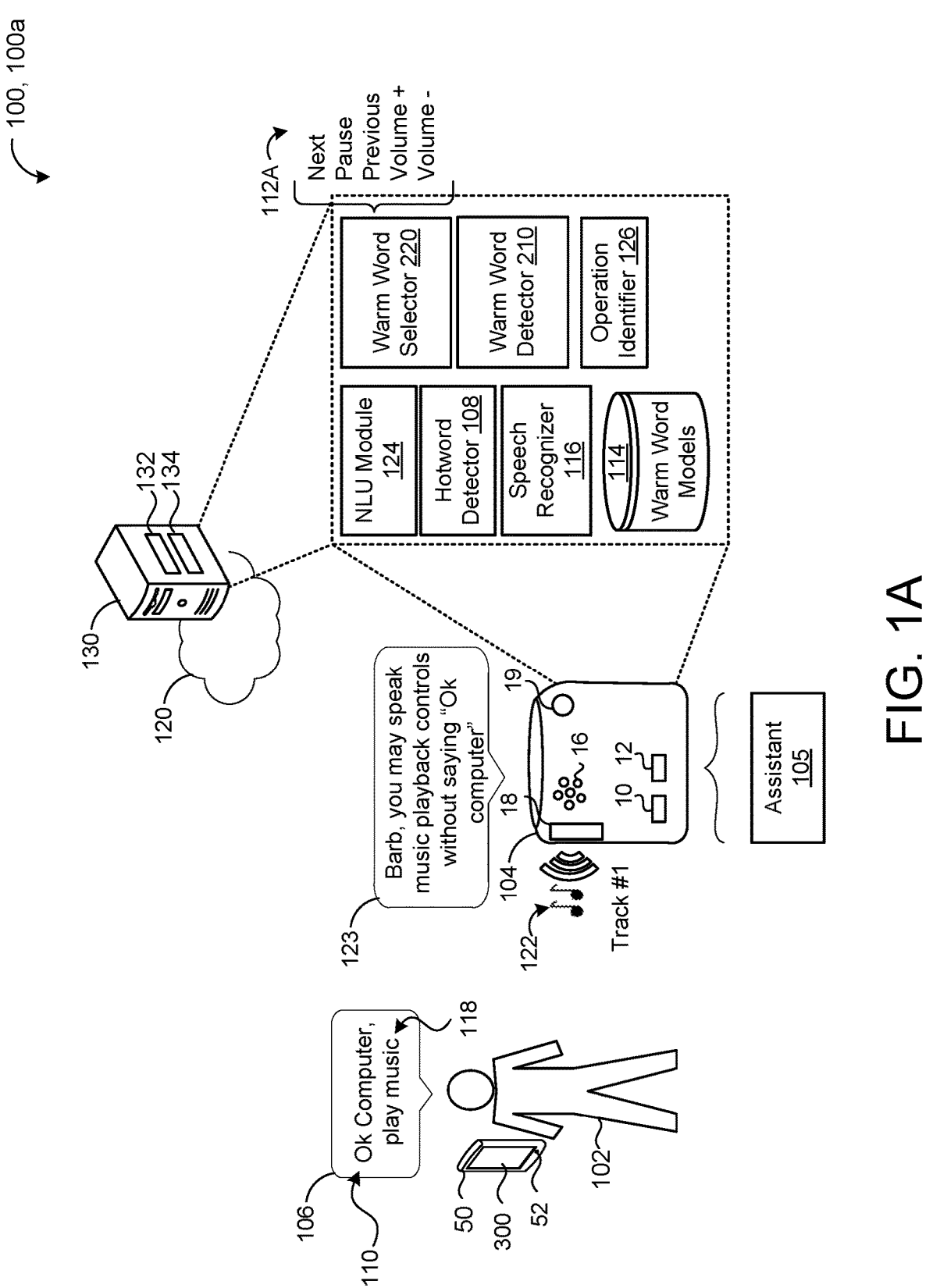
FIGS. 1A-1C are schematic views of an example system including a user controlling a long-standing operation using repeat warm words that each specify a respective action for a digital assistant to perform.
Figure 1B:
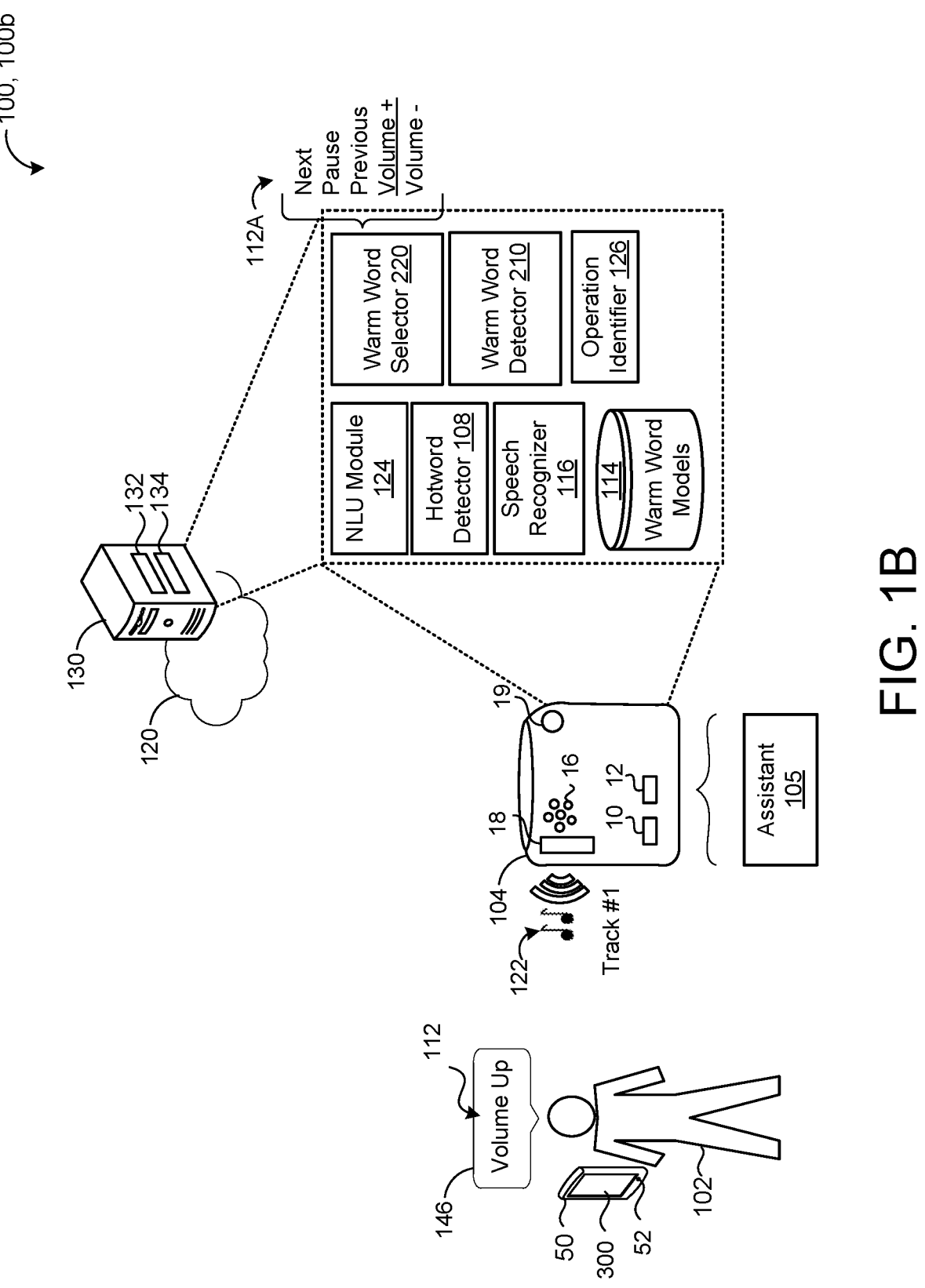
Figure 1C:
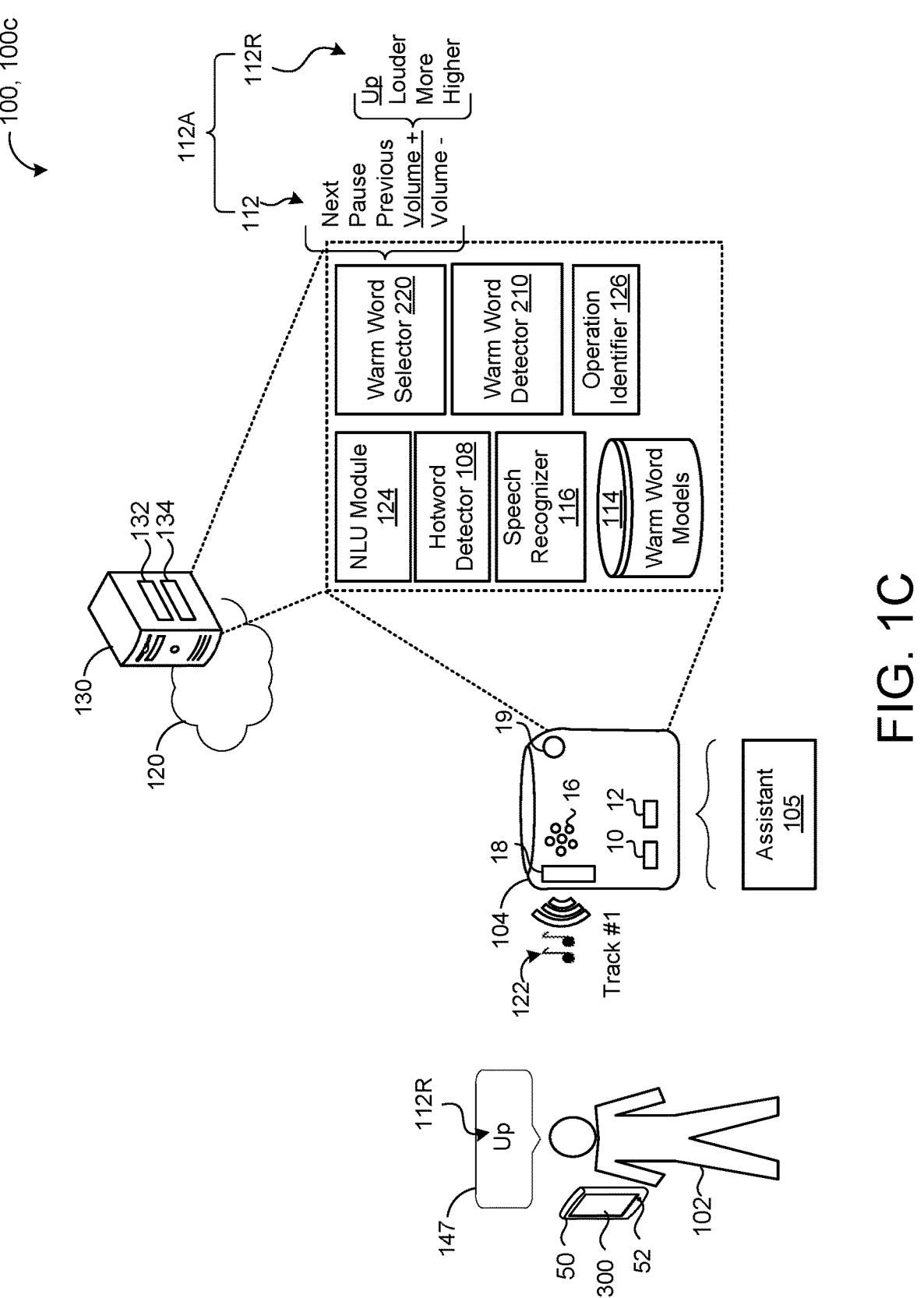

FIGS. 1A-1C illustrate example systems 100, 100a-c for activating warm words 112 for actions for controlling a long-standing operation and activating repeat warm words 112R associated with an initial warm word 112 that a user 102 spoke in an initial command for controlling the long-standing operation. Briefly, and as described in more detail below, an assistant-enabled device (AED) 104 begins to play music 122 in response to an utterance 106, "Ok computer, play music," spoken by the user 102. While the AED 104 is performing the long-standing operation of the music 122 as playback audio from a speaker 18, the AED 104 is able to detect/recognize an active warm word 112 of "volume up" (FIG. 1B) that is spoken by the user 102 as an action to control the long-standing operation, e.g., an instruction to increase the volume of the playback audio of the music 122. Because the AED 104 detects the active warm word 112 (i.e., volume up), the AED 104 activates a set of repeat warm words 112R associated with the detected active warm word 112 "volume up" to field follow-up queries that may include one of the repeat warm words 112R for a limited amount of time after detecting the active warm word 112.

The systems 100a-100c include the AED 104 executing a digital assistant 105 that the user 102 may interact with through speech. In the example shown, the AED 104 corresponds to a smart speaker that user 102 may interact with. However, the AED 104 can include other computing devices, such as, without limitation, a smart phone, tablet, smart display, desktop/laptop, smart watch, smart glasses/headset, smart appliance, headphones, or vehicle infotainment device. The AED 104 includes data processing hardware 10 and memory hardware 12 storing instructions that when executed on the data processing hardware 10 cause the data processing hardware 10 to perform operations. The AED 104 includes an array of one or more microphones 16 configured to capture acoustic sounds such as speech directed toward the AED 104. The AED 104 may also include, or be in communication with, an audio output device (e.g., speaker) 18 that may output audio such as music 122 and/or synthesized speech from the digital assistant 105. Additionally, the AED 104 may include, or be in communication with, one or more cameras 19 configured to capture images within the environment and output image data.

In some configurations, the AED 104 is in communication with a user device 50 associated with the user 102. In the examples shown, the user device 50 includes a smart phone that the user 102 may interact with. However, the user device 50 can include other computing devices, such as, without limitation, a smart watch, smart display, smart glasses, a smart phone, smart glasses/headset, tablet, smart appliance, headphones, a computing device, a smart speaker, or another assistant-enabled device. The user device 50 may include at least one microphone 52 residing on the user device 50 that is in communication with the AED 104. In these configurations, the user device 50 may also be in communication with the one or more microphones 16 residing on the AED 104. Additionally, the user 102 may control and/or configure the AED 104, as well as interact with the digital assistant 105, using an interface 300, such as a graphical user interface (GUI) 300 (FIG. 3) rendered for display on a screen of the user device 50.

FIG. 1A shows the user 102 speaking an utterance 106, "Ok computer, play music" in the vicinity of the AED 104. The microphone 16 of the AED 104 receives the utterance 106 and processes the audio data 202 that corresponds to the utterance 106. The initial processing of the audio data 202 may involve filtering the audio data 202 and converting the audio data 202 from an analog signal to a digital signal. As the AED 104 processes the audio data 202, the AED may store the audio data 202 in a buffer of the memory hardware 12 for additional processing. With the audio data 202 in the buffer, the AED 104 may use a hotword detector 108 to detect whether the audio data 202 includes the hotword. The hotword detector 108 is configured to identify hotwords that are included in the audio data 202 without performing speech recognition on the audio data 202.

In some implementations, the hotword detector 108 is configured to identify hotwords that are in the initial portion of the utterance 106. In this example, the hotword detector 108 may determine that the utterance 106 "Ok computer, play music" includes the hotword 110 "ok computer" if the hotword detector 108 detects acoustic features in the audio data 202 that are characteristic of the hotword 110. The acoustic features may be mel-frequency cepstral coefficients (MFCCs) that are representations of short-term power spectrums of the utterance 106 or may be mel-scale filterbank energies for the utterance 106. For example, the hotword detector 108 may detect that the utterance 106 "Ok computer, play music" includes the hotword 110 "ok computer" based on generating MFCCs from the audio data 202 and classifying that the MFCCs include MFCCs that are similar to MFCCs that are characteristic of the hotword "ok computer" as stored in a hotword model of the hotword detector 108. As another example, the hotword detector 108 may detect that the utterance 106 "Ok computer, play music" includes the hotword 110 "ok computer" based on generating mel-scale filterbank energies from the audio data 202 and classifying that the mel-scale filterbank energies include mel-scale filterbank energies that are similar to mel-scale filterbank energies that are characteristic of the hotword "ok computer" as stored in the hotword model of the hotword detector 108.

When the hotword detector 108 determines that the audio data 202 that corresponds to the utterance 106 includes the hotword 110, the AED 104 may trigger a wake-up process to initiate speech recognition on the audio data 202 that corresponds to the utterance 106. For example a speech recognizer 116 running on the AED 104 employing an automatic speech recognition model 117 (FIG. 2) may perform speech recognition or semantic interpretation on the audio data 202 that corresponds to the utterance 106. For example, a speech recognizer 116 running on the AED 104 may perform speech recognition or semantic interpretation on the audio data 202 that corresponds to the utterance 106. The speech recognizer 116 may perform speech recognition on the portion of the audio data 202 that follows the hotword 110. In this example, the speech recognizer 116 may identify the words "play music" in the command 118.

In some examples, the AED 104 is configured to communicate with a remote system 130 via a network 120. The remote system 130 may include remote resources, such as remote data processing hardware 132 (e.g., remote servers or CPUs) and/or remote memory hardware 134 (e.g., remote databases or other storage hardware). The AED 104 may utilize the remote resources to perform various functionality related to speech processing and/or synthesized playback communication. In some implementations, the speech recognizer 116 is located on the remote system 130 in addition to, or in lieu, of the AED 104. Upon the hotword detector 108 triggering the AED 104 to wake-up responsive to detecting the hotword 110 in utterance 106, the AED 104 may transmit the initial audio data 202 corresponding to the utterance 106 to the remote system 130 via the network 120. Here, the AED 104 may transmit the portion of the initial audio data 202 that includes the hotword 110 for the remote system 130 to confirm the presence of the hotword 110. Alternatively, the AED 104 may transmit only the portion of the initial audio data 202 that corresponds to the portion of the utterance 106 after the hotword 110 to the remote system 130, where the remote system 130 executes the speech recognizer 116 to perform speech recognition and returns a transcription of the initial audio data 202 to the AED 104.

With continued reference to FIGS. 1A-2, the AED 104 may further include an NLU module 124 that performs semantic interpretation on the utterance 106 to identify the query/command directed toward the AED 104. Specifically, the NLU module 124 identifies the words in the utterance 106 identified by the speech recognizer 116, and performs semantic interpretation to identify any speech commands in the utterance 106. The NLU module 124 of the AED 104 (and/or the remote system 130) may identify the words "play music" as a command specifying a long-standing operation (i.e., play music 122) for the digital assistant 105. In the example shown, a digital assistant 105 executing on the AED 104 begins to perform the long-standing operation of playing music 122 as playback audio (e.g., Track #1) from the speaker 18 of the AED 104. In some implementations, the AED 104 verifies the identity of the user 102 before commencing performance of the long-standing operation of playing music 122. The digital assistant 105 may stream the music 122 from a streaming service (not shown) or the digital assistant 105 may instruct the AED 104 to play music stored on the AED 104. While the example long-standing operation includes music playback, the long-standing operation may include other types of media playback, such as video, podcasts, and/or audio books. The long-standing operation may also include home automation (e.g, adjusting light levels, controlling a thermostat, etc.).

In the example shown in FIG. 1A, the AED 104 notifies the user 102 (e.g., Barb) that spoke the utterance 106 that the long-standing operation is being performed, that the warm words 112 are activated, and/or that the user 102 can speak any of the warm words 112 to instruct the AED 104 to perform the respective action for controlling the long-standing operation. For instance, the digital assistant 105 may generate synthesized speech 123 for audible output from the speaker 18 of the AED 104 that states, "Barb, you may speak music playback controls without saying 'Ok computer'". In additional examples, the digital assistant 105 may provide a notification to a user device 50 (e.g., smart phone) linked to a user account of the identified user to inform the identified user 102 (e.g., Barb) which warm words 112 are currently active for controlling the long-standing operation.

The AED 104 (and/or the server 120) may include an operation identifier 126, a warm word selector 220, and a warm word detector 210. The operation identifier 126 may be configured to identify one or more long-standing operations the digital assistant 105 is currently performing. For each long-standing operation the digital assistant 105 is currently performing, the warm word selector 220 may activate corresponding warm words 112 each associated with a respective action for controlling the long-standing operation. The warm word detector 210 receives the activated warm words 112 and, as described in more detail below, may detect a warm word 112 in streaming audio captured by the AED 104 without performing speech recognition on the captured audio.

In some examples, the warm word selector 220 accesses a registry or table (e.g., stored on the memory hardware 12) that associates the identified long-standing operation with corresponding warm words 112 that are highly correlated with the long-standing operation. For example, if the long-standing operation corresponds to a set timer function, the associated warm words 112 available for the warm word selector 220 to activate includes the warm word 112 "stop timer" for instructing the digital assistant 105 to stop the timer. Similarly, for the long-standing operation of "Call [contact name]", the associated warm words 112 includes a "hang up" and/or "end call" warm word(s) 112 for ending the call in progress. In the example shown, for the long-standing operation of playing music 122, the associated warm words 112 available for the warm word selector 220 to activate includes the warm words 112 "next", "pause", "previous", "volume up", and "volume down" each associated with the respective action for controlling playback of the music 122 from the speaker 18 of the AED 104.

Accordingly, the warm word selector 220 activates these warm words 112 (i.e., active warm words 112A) while the digital assistant 105 is performing the long-standing operation and may deactivate these warm words 112 (e.g., inactive warm words 112N) once the long-standing operation ends. Similarly, different warm words 112 may activate/deactivate depending on a state of the long-standing operation in progress. For example, if the user speaks "pause" to pause the playback of music 122, the warm word selector 220 may activate a warm word 112 for "play" to resume the playback of the music 122. In some configurations, instead of accessing a registry, the warm word selector 220 examines code associated with an application of the long-standing operation (e.g., a music application running in the foreground or background of the AED 104) to identify any warm words 112 that developers of the application want users 102 to be able to speak to interact with the application and the respective actions for each warm word 112. The warm words 112 in the registry may also relate to follow-up queries that the user 102 (or typical users) tend to issue following the given query, e.g., "Ok computer, next track". In some implementations, the warm words 112 that the warm word selector 220 activates are in addition to existing/active warm words 112. Alternatively, the warm word selector 220 may selectively activate/deactivate warm words 112 based on the processing capacity of the AED 104 to keep the total number of warm words 112 low.

Each warm word 112 in the registry may include an associated set of repeat warm words 112R, wherein one or more repeat warm words 112R in the set of repeat warm words 112R may be associated with the same respective action for controlling the long-standing operation as the warm word 112. For example, if the long-standing operation corresponds to an adjustable lighting function and the associated warm word 112 is "turn up lights", the associated repeat warm words 112R available for the warm word selector 220 to activate includes the repeat warm words 112R "again", "more", "brighter", "higher", and "lighter" for instructing the digital assistant 105 to turn up the lights. However, at least one of the repeat warm words 112R may be associated with a related action for controlling the long-standing operation as the warm word 112 such as, in the example, "less" and/or "lower" so that the user can revert to a lower level of illumination after speaking the warm word 112 "turn up lights" or one of the related repeat warm words 112R that also caused the level of illumination to increase. Similarly, for the long-standing operation of issuing queries and the warm word 112 "tell me a joke", the associated repeat warm words 112R include "another" and/or "again" for issuing additional queries. In other examples, a respective action for controlling the long-standing operation associated with at least one repeat warm word 112R is different than the respective action for controlling the long-standing operation with the associated warm word 112. For example, where the long-standing operation is seeking through content, the warm word 112 "seek forward" includes the associated repeat warm word 112R "faster" to continue the fast-forward operation, as well as the associated repeat warm word 112R "stop" to end the fast-forward operation.

In some implementations, for each warm word 112 (and each repeat warm word 112R), the AED 104 additionally receives a respective warm word model 114 configured to detect the corresponding warm word 112 in streaming audio without performing speech recognition. For example, the AED 104 (and/or the server 130) additionally includes one or more warm word models 114. Here, the warm word models 114 may be stored on the memory hardware 12 of the AED 104 or the remote memory hardware 134 on the server 130. If stored on the server 130, the AED 104 may request the server 130 to retrieve a warm word model 114 for a corresponding warm word 112 and provide the retrieved warm word model 114 so that the AED 104 (via the warm word selector 220) can activate the warm word model 114. The warm word detector 210 executing on the AED 210 may receive the activated warm word model 114 to detect an utterance of the corresponding warm word 112 in streaming audio captured by the AED 104 without performing speech recognition on the captured audio. Further, a single warm word model 114 may be capable of detecting all of the warm words 112 (and repeat warm words 112R) associated with the long-standing operation in streaming audio. In some implementations, the respective warm word model 114 for a corresponding repeat warm word 112R is derived from the respective warm word model 114 for the corresponding warm word 112.

In some configurations, the AED 104 receives code associated with an application loaded on the AED 104 (e.g., a music application running in the foreground or background of the AED 104) to identify any warm words 112 and associated warm word models 114 that developers of the application want users 102 to be able to speak to interact with the application and the respective actions for each warm word 112. In other examples, the AED 104 receives, for at least one warm word 112 in the active warm words 112A for at least one user 102, via a warm word application programming interface (API) executing on the AED 104, a respective warm word model 114 configured to detect the corresponding warm word 112 in streaming audio without performing speech recognition. The warm words 112 in the registry may also relate to follow-up queries that the user 102 (or typical users) tends to issue following the given query, e.g., "Ok computer, play my music playlist".

In additional implementations, activating the warm words 112A causes the AED 104 to execute the speech recognizer 116 in a low-power and low-fidelity state. Here, the speech recognizer 116 is constrained or biased to only recognize the active warm words 112A when spoken in utterances captured by the AED 104. Since the speech recognizer 116 is only recognizing a limited number of terms/phrases, the number of parameters of the speech recognizer 116 may be drastically reduced, thereby reducing the memory requirements and number of computations needed for recognizing the active warm words in speech. Accordingly, the low-power and low-fidelity characteristics of the speech recognizer 116 may be suitable for execution on a digital signal processor (DSP). In these implementations, the speech recognizer 116 executing on the AED 104 may recognize an utterance of a warm word 112 in streaming audio captured by the AED 104 in lieu of using a warm word model 114. Here, the low-power speech recognizer 116 may be activated upon detecting a warm word 112, or could be always running on-device in the background while the long-standing operation is being performed by the AED 104. In these implementations, each user 102 expressly grants privileges to the digital assistant 105 to perform speech recognition and each user 102 has the option to revoke the granted privilege at any time. In some examples, detection of a warm word 112 by a corresponding warm word model 114 is confirmed by the speech recognizer 116 performing speech recognition on the audio data.

Referring to FIG. 1B, while the digital assistant 105 is performing the long-standing operation of playing music 122, the user 102 speaks an utterance 146 that includes one of the warm words 112 from the activated set of warm words 112A. In the example shown, the user 102 utters the active warm word 112A "volume up". Without performing speech recognition on the captured audio, the AED 104 may apply the warm word models 114 activated for the set of warm words 112A to identify whether the utterance 146 includes any active warm words 112A. The active warm words 112 may be "next", "pause", "previous", "volume up", and "volume down". The warm word detector 210 compares the audio data that corresponds to the utterance 146 to the activated warm word models 114 that correspond to the active warm words 112 "next," "pause," "previous," "volume up," and "volume down" and determines that the warm word model 114 activated for the warm word 112 "volume up" detects the warm word 112 "volume up" in the utterance 146 without performing speech recognition on the audio data. After the warm word 112 "volume up" is detected in the additional audio 202 corresponding to the additional utterance 146, the digital assistant 105 executing on the AED 104 begins to perform the respective action associated with the detected warm word 112 "volume up" of increasing the volume of the music 122. In some implementations, in response to detecting the hotword 110 and the command 118, the AED 104 activates the repeat warm words 112R associated with the command 118 "play music" in addition to the warm words 112 associated with the command 118 "play music", such that the warm word detector 210 can detect a repeat warm words 112R without first detecting the associated warm word 112 in audio.

In some implementations, the AED 104 identifies warm words 112 that are not among the activated set of one or more warm words 112 but whose models are still stored in the warm word models 114. In this instance, the AED 104 may provide an indication to the user device 50 to display in the GUI 300 that the warm word 112 is not among (e.g., inactive) the activated set of the one or more warm words 112. For example, the user 102 may speak "play" when the music 122 is playing. The AED 104 may identify the warm word 112N "play." Because the warm word 112 "play" is not among the activated set of one or more warm words 112A, the AED 104 performs no action. However, the user device 50 may display in GUI 300 an indication that the warm word "play" is an inactive warm word 112N and indicate that the active warm words 112A are "next," "pause," "previous," "volume up," and "volume down."

The warm word detector 210 may detect that the associated utterance 146 includes one of the warm words 112 from the activated set of one or more warm words 112 by extracting audio features of the audio data associated with the utterance 146. The activated warm word models 114 may each generate a corresponding warm word confidence score by processing the extracted audio features and comparing the corresponding warm word confidence score to a warm word confidence threshold. For instance, the warm word models 114 may collectively generate corresponding warm word confidence scores for each of the active warm words 112 "play", "next", "pause", "previous", volume up", and "volume down". In some implementations, the speech recognizer 116 generates a warm word confidence score for each portion of processed audio data associated with the utterance 146. If the warm word confidence score satisfies a threshold, then the warm word model 114 determines that the audio data corresponding to the utterance 146 includes a warm word 112 among the activated set of the one or more warm words 112. For example, if the warm word confidence score generated by a warm word model 114 (or the speech recognizer 116) is 0.9 and the warm word confidence threshold is 0.8, then the AED 104 determines that the audio data corresponding with the utterance 146 includes a warm word 112.

In some implementations, if the warm word confidence score is within a range below the threshold, the digital assistant 105 may generate synthesized speech 123 for audible output from the speaker 18 of the AED 104 that requests that the user 102 confirm or repeat the warm word 112. In these implementations, if the user 102 confirms that the user 102 spoke the warm word 112, the AED may use the audio data to update the corresponding warm word model 114.

In addition to performing the respective action associated with the warm word 112 "volume up" detected by the warm word detector 210, the warm word selector 220 may activate the corresponding repeat warm words 112R each associated with the detected warm word 112 "volume up" for a limited amount of time after detecting the active warm word 112 "volume up". Here, each of the activated set of one or more repeat warm words 112R is associated with the respective action of increasing the volume of the music 112. In some implementations, in response to the warm word detector 210 detecting the warm word 112 "volume up", the warm word selector 220 activates a set of warm words 112A each associated with a respective action for controlling a different long-standing operation than the long-standing operation of playing music 122. For example, the different long-standing operation may control the lighting in an environment of the user 102, where the user 102 may be more likely to adjust the lighting up or down when the volume of the music 122 is increased (e.g., for a party).

In some implementations, the warm word selector activates the repeat warm words 112R for a predetermined time duration (e.g., 10 seconds). Here, once the predetermined time duration lapses, the warm word selector 220 deactivates the repeat warm words 112R. For example, if the warm word detector 220 fails to detect a repeat warm word 112R in an utterance within the predetermined time duration, the set of repeat warm words 112R are deactivated, and are no longer detected in audio. Conversely, if the warm word detector 220 detects one of the repeat warm words 112R in an utterance within the predetermined time duration, the warm word selector 210 may reset the predetermined time duration and wait to see if the user 102 speaks one of the repeat warm words 112R again.

In the example shown in FIG. 1C, for the warm word 112 "volume up", the associated repeat warm words 112R available for the warm word selector 220 to activate includes the repeat warm words 112R "up", "louder", "more", and "higher" each associated with the respective action for controlling playback of the music 122 from the speaker 18 of the AED 104. Accordingly, the warm word selector 220 activates these repeat warm words 112R (i.e., active warm words 112A) in addition to the other active warm words 112A "next", "pause", "previous", "volume up", and "volume down" while the digital assistant 105 is performing the long-standing operation, and may deactivate these repeat warm words 112R (e.g., inactive warm words 112N) once the long-standing operation ends.

As shown, while the digital assistant 105 continues performing the long-standing operation of playing music 122, the user 102 speaks an utterance 147 that includes one of the repeat warm words 112R from the activated set of repeat warm words 112R. In the example shown, the user 102 utters the active repeat warm word 112R "up". Without performing speech recognition on the captured audio, the AED 104 may apply the warm word models 114 activated for the set of repeat warm words 112R to identify whether the utterance 147 includes any active warm words 112A and/or any active repeat warm words 112R. The active repeat warm words 112R may be "up", "louder", "more", and "higher". The warm word detector 210 compares the audio data that corresponds to the utterance 147 to the activated warm word models 114 that correspond to the active repeat warm words 112R "up", "louder", "more", and "higher" and determines that the warm word model 114 activated for the repeat warm word 112R "up" detects the repeat warm word 112 "up" in the utterance 146 without performing speech recognition on the audio data. As described above, the respective warm word model 114 activated for the repeat warm word 112R "up" may be derived from the warm word model 114 activated for detecting the corresponding warm word 112 "volume up" in the audio data. After the repeat warm word 112R "up" is detected in the additional audio 202 corresponding to the utterance 147, the digital assistant 105 executing on the AED 104 performs the respective action associated with the detected warm word 112 "volume up" of increasing the volume of the music 122.

As described above with respect to the warm words 112, the warm word detector 210 may detect that the associated utterance 147 includes one of the repeat warm words 112R from the activated set of one or more repeat warm words 112R by extracting audio features of the audio data associated with the utterance 147. The activated warm word models 114 may each generate a corresponding repeat warm word confidence score by processing the extracted audio features and comparing the corresponding repeat warm word confidence score to a repeat warm word confidence threshold. For instance, the warm word models 114 may collectively generate corresponding repeat warm word confidence scores for each of the active repeat warm words 112R "up", "louder", "more", and "higher". In some implementations, the speech recognizer 116 generates a repeat warm word confidence score for each portion of processed audio data associated with the utterance 147. If the repeat warm word confidence score satisfies a threshold, then the warm word detector 210 determines that the audio data corresponding to the utterance 147 includes a repeat warm word 112R among the activated set of the one or more repeat warm words 112R. For example, if the repeat warm word confidence score generated by the warm word detector 210 (or the speech recognizer 116) is 0.9 and the repeat warm word confidence threshold is 0.8, then the AED 104 determines that the audio data corresponding with the utterance 147 includes a repeat warm word 112R.

In some implementations, if the repeat warm word confidence score is within a range below the threshold, the digital assistant 105 may generate synthesized speech 123 for audible output from the speaker 18 of the AED 104 that requests that the user 102 confirm or repeat the repeat warm word 112R. In these implementations, if the user 102 confirms that the user 102 spoke the repeat warm word 112R, the AED 104 may use the audio data to update the corresponding warm word model 114.

In some implementations, after performing the respective action associated with the detected repeat warm word 112R "up" for controlling the long-standing operation of the music 122, the warm word selector 220 maintains activation of at least one of the repeat warm words 112R in the set of repeat warm words 112R associated with the detected warm word 112 "volume up". For example, the warm word selector 220 maintains activation of the repeat warm word 112R "up" so that the user 102 can continue to speak "up . . . up . . . up". In some implementations, the AED 104 may adjust the parameters for increasing the volume in response to detecting the repeat warm word 112R. For example, the AED 104 may lower the detection threshold for detecting subsequent warm words 112 (and/or repeat warm words 112R). Additionally or alternatively, the AED 104 may adjust the parameters for controlling the long-standing operation. For example, the AED 104 may detect that the user 102 always issues a sequence of two of the repeat warm word 112R "up", and may adjust the volume increments so that, in future interactions with the user 102, the AED 104 adjusts the volume at a greater increment for each instance of the repeat warm word 112R "up".

In some implementations, after the AED 104 performs the respective action of increasing the volume of the music 122 associated with the detected repeat warm word 112R "up", the warm word selector 220 deactivates the set of one or more repeat warm words 112R. For example, the warm word selector 220 deactivates the set of repeat warm words 112R based on receiving a command that conflicts with the long-standing operation. Here, the command may be a manual input to the GUI 300 of the user device 50, a voice command, or other operation that stops the long-standing operation. In other examples, the warm word selector 220 deactivates the set of repeat warm words 112R based on failing to detect a repeat warm word 112R in the activated set of one or more repeat warm words 112R after a predetermined time duration lapses since the user last spoke the initial warm word 112 or one of the repeat warm words 112R. In some examples, the predetermined time duration is variable and depends on the repeat warm word 112R detected, the warm word 112 detected, and/or is personalized for the particular user 102 that spoke the utterance.

Referring now to FIG. 3, a GUI 300 executing on the user device 50 may render for display an identifier of the long-standing operation (e.g., "Playing Track 1"), an identifier of the AED 104 (e.g., smart speaker) that is currently performing the long-standing operation, and/or an identity of the active user 102 (e.g., Barb) that initiated the long-standing operation. In some implementations, the identity of the active user 102 includes an image 304 of the active user 102. Here, the user 102 may speak any of the active warm words 112 displayed in GUI 300 to perform a respective action for controlling the long-standing operation. While the GUI 300 of FIG. 3 is shown executing on the user device 50 in communication with the AED 104, in other implementations the GUI 300 executes on a screen of the AED 104.

The user device 50 may also render graphical elements 302 for display in the GUI 300 for performing the respective actions associated with the respective active warm words 112A to playback of the music 122 from the speaker 18 of the AED 104. In other words, the GUI 300 allows the user 102 to select which warm words 112 to add to the active set of warm words 112A, (FIGS. 1A-1C). In the example shown, the GUI 300 presents a list of available warm words 112 displayed as respective graphical elements that may be selected to add or remove the corresponding available warm word to the respective active set of warm words 112A that the user wants the AED 104 to detect, and ultimately perform the respective action specified by the corresponding warm word, when spoken by the user 102. As shown, the warm words 112 include the active warm words 112 "next", "pause", "previous", "volume up", and "volume down", as well as the inactive warm word 112N "play". Moreover, in response to the warm word detector 220 detecting the warm word 112 "volume up", the GUI 300 highlights/selects the corresponding graphical element for "volume up" and presents a list of available repeat warm words 112R to add/or remove from the set of one or more repeat warm words 112R associated with the warm word 112 "volume up". Specifically, the list includes the graphical elements 302 for the repeat warm words 112R "louder", "more", "up", "higher", "pause", "previous", "next", and "quieter" are shown. As described above, the repeat warm words 112R that are activated may correspond to the same action of increasing the volume of the music 122 as the detected warm word 112 "volume up" and/or to a different action of decreasing the volume of the music (e.g., the repeat warm word 112R "quieter"). In the example shown, the repeat warm words 112R of "louder", "more", "up", "higher", and "quieter" are selected and active for the AED 104 (via the warm word detector 220) to detect in audio. In some implementations, the list of repeat warm words 112R for each corresponding warm word 112 is predetermined by the manufacturer of the application. In other implementations, the list of repeat warm words 112R is manually added by the user 102 or learned by the warm word detector 210 based on previous interactions with the user 102.

In some implementations, the GUI 300 receives a user input indication indicating selection of one or more of the available repeat warm words 112R in the list of displayed repeat warm words 112R to add/remove the set of one or more repeat warm words 112R. The GUI 300 may receive user input indications via any one of touch, speech, gesture, gaze, and/or an input device (e.g., mouse or stylist). For example the user 102 may provide a user input indication indicating selection of the "pause" control (e.g., by touching the graphical button in the GUI 300 for the repeat warm word 112R "pause") to cause the AED 104 (via the warm word selector 210) to add the repeat warm word 112R "pause" to the active warm words 112A for detection by the AED 104. Here, when As shown, the GUI 300 displays a graphical element 306 for the user 102 to customize the list of warm words 112. Here, the warm word detector 210 (or the speech recognizer 116) may maintain a voice command log 212 (FIG. 2) containing prior instances of a user 102 speaking repeat voice commands for controlling the long-standing operation immediately after the warm word detector 210 detects a warm word 112A in prior audio data 202. In these examples, the repeat voice commands may indicate that the user 102 associates the repeat voice commands with the detected warm word 112A. Here, at least one of the repeat warm words 112R in the activated set of warm words 112A is learned based on the repeat voice commands. In these examples, the repeat voice commands may be used to train a respective warm word model 114 for the learned repeat warm word 112R.

As shown, the graphical element 306 includes a selectable option for the user 102 to add the word (s) "skip" and/or "more more" to the list of repeat warm words 112R and/or the active warm words 112A. Here, the AED 104 may have learned the repeat voice command "more more", where the graphical element 306 operates to present a prompt to the user 102 to add the repeat voice command "more more" to the list of repeat warm words 112R. Additionally, the graphical element 306 includes a text box for the user 102 to manually enter a word to add to the list of repeat warm words 112 by typing or speech input.

FIG. 4 is a flowchart of an example arrangement of operations for a method 400 for detecting repeat warm words. At operation 402, the method 400 includes activating a set of one or more warm words 112 each associated with a respective action for controlling a long-standing operation performed by a digital assistant 105. While the digital assistant 105 is performing the long-standing operation and the set of one or more warm words 112 are activated, the method 400 also includes, at operation 404, receiving audio data 202 corresponding to a first utterance 146 captured by an assistant-enabled device 104. At operation 406, the method 400 also includes detecting, in the audio data 202, a warm word 112 from the activated set of one or more warm words 112.

In response to detecting the warm word 112 from the activated set of one or more warm words 112, the method 400 also includes, at operation 408, performing the respective action associated with the detected warm word 112 for controlling the long-standing operation, and activating a set of one or more repeat warm words 113 associated with the detected warm word 112. Here, each of the activated set of one or more repeat warm words 113 is associated with a respective action for controlling the long-standing operation. At operation 510, the method 400 includes receiving additional audio data 202 corresponding to a second utterance 147 captured by the assistant-enabled device 104. The method 400 also includes, at operation 412, detecting, in the additional audio data 202, a repeat warm word 113 from the activated set of one or more repeat warm words 113. In response to detecting the repeat warm word 113 from the set of one or more repeat warm words 113, the method 400 also includes, at operation 412, performing the respective action associated with the detected repeat warm word 113 for controlling the long-standing operation.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:

obtaining a voice command log containing prior instances of a user of an assistant-enabled device speaking repeat voice commands for controlling a long-standing operation performed by a digital assistant immediately after detecting warm words from a set of one or more warm words in prior audio data;

activating the set of one or more warm words, wherein each corresponding warm word in the activated set of one or more warm words is associated with:

a respective action for controlling the long-standing operation performed by the digital assistant; and a respective set of repeat warm words, wherein:

two or more repeat warm words in the respective set of repeat warm words is associated with the same respective action for controlling the long-standing operation as the corresponding warm word; and at least one repeat warm word in the respective set of repeat warm words is learned based on the repeat voice commands; and while the digital assistant is performing the long-standing operation and the set of one or more warm words are activated:

receiving audio data corresponding to a first utterance captured by an assistant-enabled device;

detecting, in the audio data, a warm word from the activated set of one or more warm words;

in response to detecting the warm word from the activated set of one or more warm words:

performing the respective action associated with the detected warm word for controlling the long-standing operation; and activating the respective set of repeat warm words associated with the detected warm word for a limited duration of time after the warm word is detected in the audio data;

receiving additional audio data corresponding to a second utterance captured by the assistant-enabled device;

detecting, in the additional audio data, a repeat warm word from the activated set of repeat warm words, the detected repeat warm word associated with the same respective action as the performed respective action associated with the detected warm word for controlling the long-standing operation; and in response to detecting the repeat warm word from the activated set of repeat warm words, performing the same respective action associated with the detected repeat warm word for controlling the long-standing operation.

2. The method of claim 1, wherein:

activating the set of repeat warm words comprises activating, for each corresponding repeat warm word in the activated set of repeat warm words, a respective repeat warm word model to run on the assistant-enabled device; and detecting, in the additional audio data, the repeat warm word from the activated set of repeat warm words comprises detecting, using the respective repeat warm word model activated for the corresponding detected repeat warm word, the repeat warm word in the additional audio data without performing speech recognition on the additional audio data.

3. The method of claim 2, wherein detecting the repeat warm word in the additional audio data comprises:

extracting audio features of the additional audio data;

generating, using the respective repeat warm word model activated for the corresponding detected repeat warm word, a repeat warm word confidence score by processing the extracted audio features; and determining that the additional audio data corresponding to the second utterance includes the corresponding repeat warm word when the repeat warm word confidence score satisfies a repeat warm word confidence threshold.

4. The method of claim 2, wherein:

detecting, in the audio data, the warm word from the activated set of one or more warm words comprises detecting, using a respective warm model activated for the corresponding warm word, the warm word in the audio data without performing speech recognition on the audio data; and the respective repeat warm word model activated for the corresponding detected repeat warm word in the additional audio data is derived from the respective warm word model activated for detecting the corresponding warm word in the audio data.

5. The method of claim 1, wherein:

activating the set of repeat warm words comprises executing a speech recognizer on the assistant-enabled device, the speech recognizer biased to recognize the repeat warm words in the activated set of repeat warm words; and detecting, in the additional audio data, the repeat warm word from the activated set of repeat warm words comprises recognizing, using the speech recognizer executing on the assistant-enabled device, the repeat warm word in the additional audio data.

6. The method of claim 1, wherein the operations further comprise receiving, in a user interface associated with the assistant-enabled device that presents a list of available repeat warm words to add and/or remove from the set of repeat warm words associated with the warm word and to be activated when the warm word is detected in the audio data, a user input indication indicating selection of one or more of the available repeat warm words to add to the set of repeat warm words.

7. The method of claim 6, wherein each corresponding available repeat warm word in the list of available repeat warm words presented by the user interface associated with the assistant-enabled device are displayed by the user interface as a respective graphical element that may be selected to add or remove the corresponding available repeat warm word to the set of repeat warm words associated with warm word and to be activated when the warm word is detected in the audio data.

8. The method of claim 1, wherein the operations further comprise:
  prompting a user of the assistant-enabled device to add a repeat voice command contained in the voice command log to the set of repeat warm words associated with the detected warm word;
  in response to receiving a user indication indicating an approval to add the repeat voice command to the set of repeat warm words, associating the repeat voice command with the detected warm word; and
  activating the repeat voice command as a repeat warm word associated with the detected warm word.

9. The method of claim 1, wherein the respective action for controlling the long-standing operation that is associated with at least one repeat warm word in the activated set of repeat warm words is different than the respective action performed in response to detecting the associated warm word from the activated set of one or more warm words in the audio data.

10. The method of claim 1, wherein activating the set of repeat warm words associated with the detected warm word comprises activating the set of repeat warm words for a predetermined time duration.

11. The method of claim 1, wherein the operations further comprise, after performing the same respective action associated with the detected repeat warm word for controlling the long-standing operation, maintaining activation of at least one of the repeat warm words in the set of repeat warm words associated with the detected warm word.

12. The method of claim 1, wherein the operations further comprise, after performing the respective action associated with the detected repeat warm word for controlling the long-standing operation, deactivating the set of repeat warm words based on:
  receiving a command that conflicts with the long-standing operation; or
  failing to detect an additional repeat warm word of the activated set of repeat warm words after a predetermined time duration lapses.

13. A system comprising:
  data processing hardware; and
  memory hardware in communication with the data processing hardware, the memory hardware storing instructions that when executed on the data processing hardware cause the data processing hardware to perform operations comprising:
    obtaining a voice command log containing prior instances of a user of an assistant-enabled device speaking repeat voice commands for controlling a long-standing operation performed by a digital assistant immediately after detecting warm words from a set of one or more warm words in prior audio data;

activating the set of one or more warm words, wherein each corresponding warm word in the activated set of one or more warm words is associated with:
      a respective action for controlling the long-standing operation performed by the digital assistant; and
      a respective set of repeat warm words, wherein:
        two or more repeat warm words in the respective set of repeat warm words is associated with the same respective action for controlling the long-standing operation as the corresponding warm word; and
        at least one repeat warm word in the respective set of repeat warm words is learned based on the repeat voice commands; and
    while the digital assistant is performing the long-standing operation and the set of one or more warm words are activated:
      receiving audio data corresponding to a first utterance captured by an assistant-enabled device;
      detecting, in the audio data, a warm word from the activated set of one or more warm words;
      in response to detecting the warm word from the activated set of one or more warm words:
        performing the respective action associated with the detected warm word for controlling the long-standing operation; and
        activating the respective set of repeat warm words associated with the detected warm word;
    receiving additional audio data corresponding to a second utterance captured by the assistant-enabled device;
    detecting, in the additional audio data, a repeat warm word from the activated set of repeat warm words, the detected repeat warm word associated with the same respective action as the performed respective action associated with the detected warm word for controlling the long-standing operation; and
    in response to detecting the repeat warm word from the activated set of repeat warm words, performing the same respective action associated with the detected repeat warm word for controlling the long-standing operation.

14. The system of claim 13, wherein:
  activating the set of repeat warm words comprises activating, for each corresponding repeat warm word in the activated set of repeat warm words, a respective repeat warm word model to run on the assistant-enabled device; and
  detecting, in the additional audio data, the repeat warm word from the activated set of repeat warm words comprises detecting, using the respective repeat warm word model activated for the corresponding detected repeat warm word, the repeat warm word in the additional audio data without performing speech recognition on the additional audio data.

15. The system of claim 14, wherein detecting the repeat warm word in the additional audio data comprises:
  extracting audio features of the additional audio data;
  generating, using the respective repeat warm word model activated for the corresponding detected repeat warm word, a repeat warm word confidence score by processing the extracted audio features; and
  determining that the additional audio data corresponding to the second utterance includes the corresponding repeat warm word when the repeat warm word confidence score satisfies a repeat warm word confidence threshold.

16. The system of claim 14, wherein:

detecting, in the audio data, the warm word from the activated set of one or more warm words comprises detecting, using a respective warm model activated for the corresponding warm word, the warm word in the audio data without performing speech recognition on the audio data; and the respective repeat warm word model activated for the corresponding detected repeat warm word in the additional audio data is derived from the respective warm word model activated for detecting the corresponding warm word in the audio data.

17. The system of claim 13, wherein:

activating the set of repeat warm words comprises executing a speech recognizer on the assistant-enabled device, the speech recognizer biased to recognize the repeat warm words in the activated set of repeat warm words; and detecting, in the additional audio data, the repeat warm word from the activated set of repeat warm words comprises recognizing, using the speech recognizer executing on the assistant-enabled device, the repeat warm word in the additional audio data.

18. The system of claim 13, wherein the operations further comprise receiving, in a user interface associated with the assistant-enabled device that presents a list of available repeat warm words to add and/or remove from the set of repeat warm words associated with the warm word and to be activated when the warm word is detected in the audio data, a user input indication indicating selection of one or more of the available repeat warm words to add to the set of repeat warm words.

19. The system of claim 18, wherein each corresponding available repeat warm word in the list of available repeat warm words presented by the user interface associated with the assistant-enabled device are displayed by the user interface as a respective graphical element that may be selected to add or remove the corresponding available repeat warm word to the set of repeat warm words associated with warm word and to be activated when the warm word is detected in the audio data.

20. The system of claim 13, wherein the operations further comprise:

prompting a user of the assistant-enabled device to add a repeat voice command contained in the voice command log to the set of repeat warm words associated with the detected warm word;

in response to receiving a user indication indicating an approval to add the repeat voice command to the set of repeat warm words, associating the repeat voice command with the detected warm word; and activating the repeat voice command as a repeat warm word associated with the detected warm word.

21. The system of claim 13, wherein the respective action for controlling the long-standing operation that is associated with at least one repeat warm word in the activated set of repeat warm words is different than the respective action performed in response to detecting the associated warm word from the activated set of one or more warm words in the audio data.

22. The system of claim 13, wherein activating the set of repeat warm words associated with the detected warm word comprises activating the set of repeat warm words for a predetermined time duration.

23. The system of claim 13, wherein the operations further comprise, after performing the same respective action associated with the detected repeat warm word for controlling the long-standing operation, maintaining activation of at least one of the repeat warm words in the set of repeat warm words associated with the detected warm word.

24. The system of claim 13, wherein the operations further comprise, after performing the respective action associated with the detected repeat warm word for controlling the long-standing operation, deactivating the set of repeat warm words based on:

receiving a command that conflicts with the long-standing operation; or failing to detect an additional repeat warm word of the activated set of repeat warm words after a predetermined time duration lapses.

* * * * *